United States Patent [19]

Lapeyrouse

[11] Patent Number: 4,903,759
[45] Date of Patent: Feb. 27, 1990

[54] APPARATUS AND METHOD FOR MONITORING AND CONTROLLING HEATING AND/OR COOLING SYSTEMS

[76] Inventor: John G. Lapeyrouse, P.O. Box 91445, Mobile, Ala. 36609

[21] Appl. No.: 101,176

[22] Filed: Sep. 25, 1987

[51] Int. Cl.$^4$ ............................................. G05D 23/00
[52] U.S. Cl. .................................. 165/11.1; 236/91 F
[58] Field of Search ............... 236/10, 11, 46 R, 91 F; 165/11.1

[56] References Cited

U.S. PATENT DOCUMENTS 3,549,088 12/1970 Obenhaus ........................ 236/11 X
4,055,297 10/1977 Lee ....................................... 236/11

Primary Examiner—Henry A. Bennet
Attorney, Agent, or Firm—Daniel E. McConnell

[57] ABSTRACT

This invention relates to an apparatus and method for monitoring and controlling a heating and/or cooling system which controls the temperature of air in a conditioned space within a building and to such an apparatus and method capable of indicating the performance of such a system and effectuating control over the system for maximizing the operating efficiency of the system. As compared with a conventional control system, additional temperature sensors are provided to sense the temperatures of air drawn into and discharged from a temperature modifying unit such as an air handling unit having a heat exchange coil. The sensed temperatures are then used as a basis for determining the differential attained by flowing air through the unit, and compared with a desired differential taken as indicating an optimal condition, with the percentage of attainment of the optimal differential being visually displayed for an operator of the system. The attainment or non-attainment of certain target differentials within certain predetermined time intervals is used to control the operation of the system by either stopping such operation and draw attention to a clearly defective system or cycling the system to operate a satisfactory system in the most economical way. Application to systems other than circulating air systems is suggested.

18 Claims, 9 Drawing Sheets

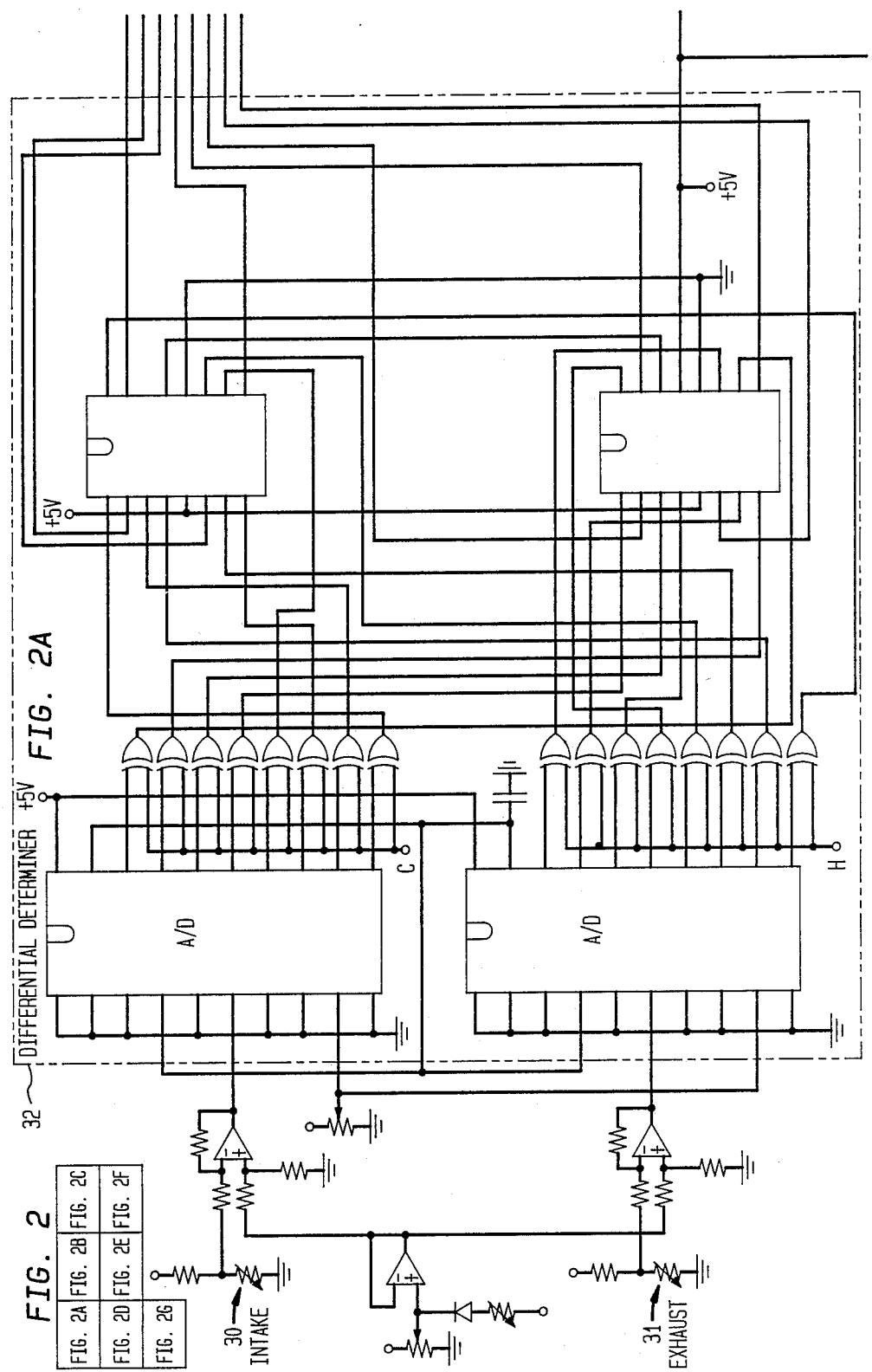

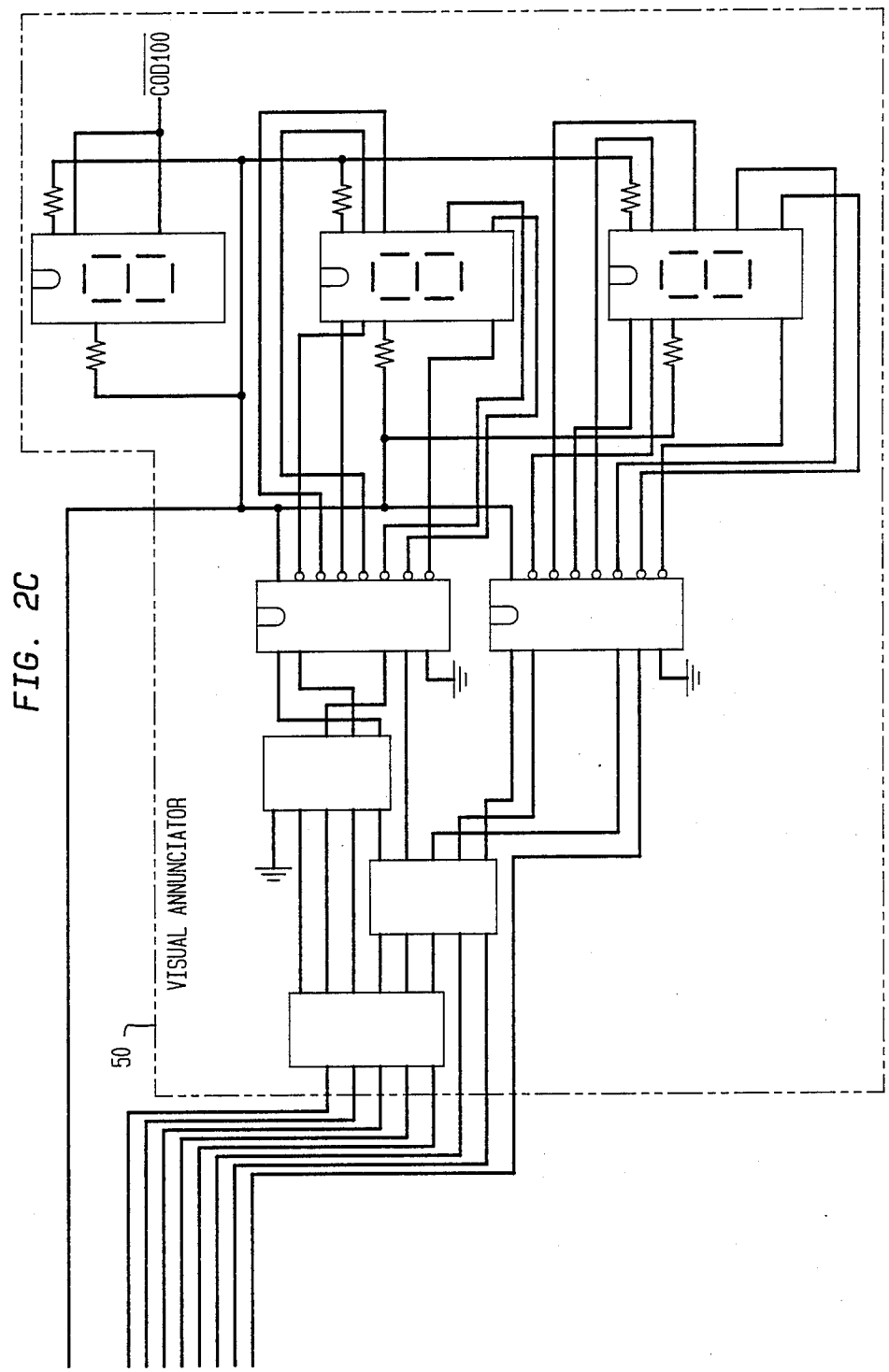

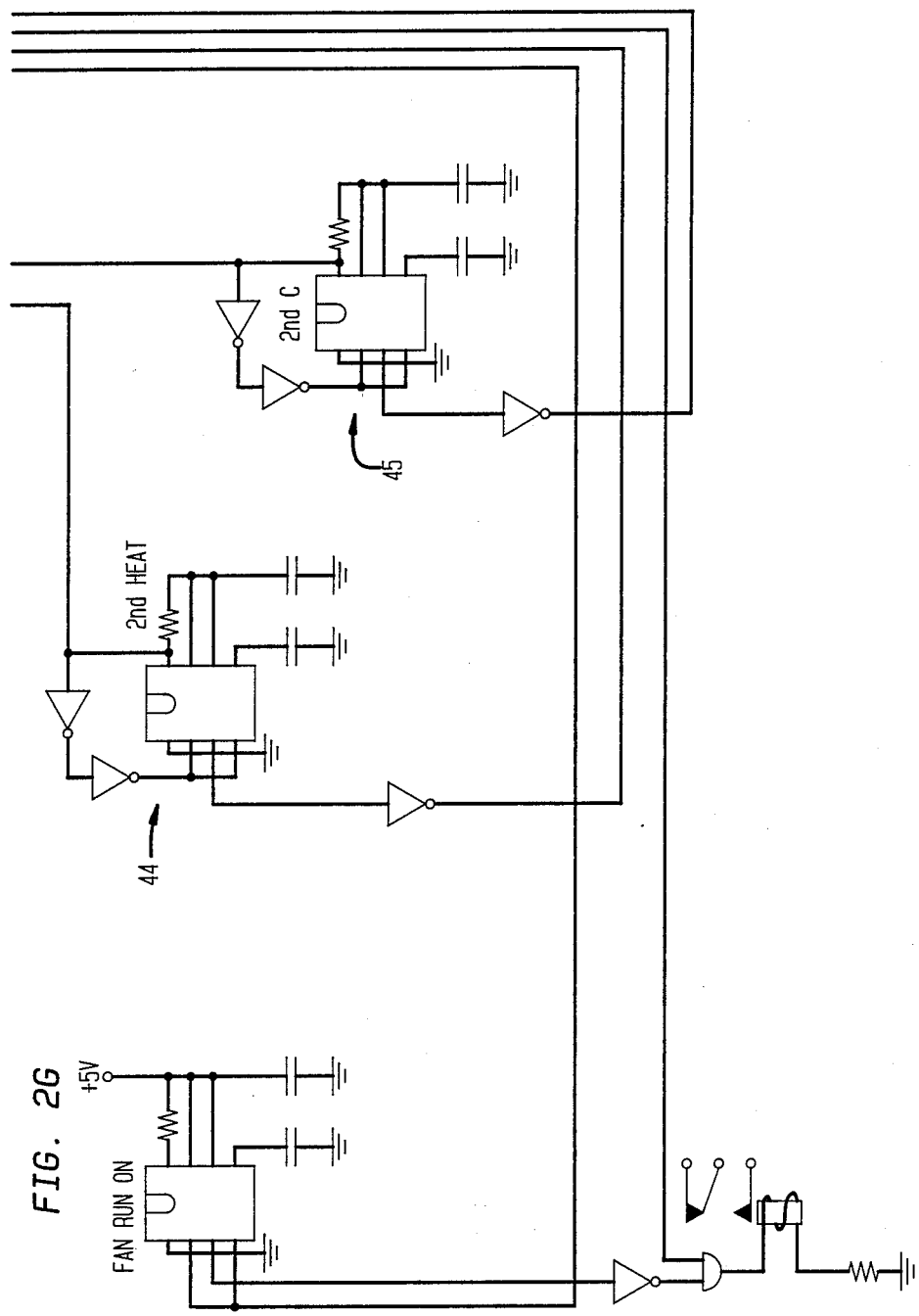

APPARATUS AND METHOD FOR MONITORING AND CONTROLLING HEATING AND/OR COOLING SYSTEMS

FIELD AND BACKGROUND OF INVENTION

This invention relates to an apparatus and method for monitoring and controlling a heating and/or cooling system which controls the temperature of air in a conditioned space within a building or a commercial freezer or refrigeration unit. More particularly, this invention relates to such an apparatus and method capable of indicating the performance of such a system and effectuating control over the system for maximizing the operating performance of the system.

Most dwellings and commercial buildings now in use are serviced by systems for circulating a flow of air through the spaces within the building and controlling the temperature of the circulating flow of air. Such systems may use various means of heating and/or cooling the flow of air, including combustion of fuels, mechanical refrigeration systems circulating liquids, and dual cycle systems of the types known as heat pumps. Such systems conventionally have temperature sensors in the conditioned spaces for sensing air temperatures in those spaces (often known as thermostats) and control systems responsive to the temperature sensors for changing the temperature of flowing air to reach and maintain a desired temperature in the conditioned space.

It has been recognized heretofore that such systems may have varying performance, and that maintenance of satisfactory system performance (herein sometimes also referred to as operating efficiency) is beneficial in minimizing the costs of maintaining the desired temperature effects within a building. It has been proposed heretofore that certain additional temperature measurements may be used to monitor the operation of a system, or that system performance may be somewhat controlled by the provision of timing controls which govern the intervals of operation of a system. However, such proposals typically do not assure than an operator of a system be advised of the performance attained or not attained, in order that preventative maintenance be applied to sustain system performance.

BRIEF DESCRIPTION OF INVENTION

With the foregoing in mind, it is an object of this invention to provide, in a control system for a temperature modifying system such as a heating and/or air conditioning system, an improved apparatus for monitoring the system performance and providing a visual indication of the useful output attained by the system. In realizing this object of the present invention, additional temperature sensors are provided to sense the temperatures of air drawn into and discharged from a temperature modifying unit such as an air handling unit having a heat exchange coil. The sensed temperatures are then used as a basis for determining the differential attained by flowing air through the unit, and compared with a desired differential taken as indicating an optimal condition, with the percentage of attainment of the optimal differential being visually displayed for an operator of the system.

Yet a further object of this invention is to provide, in a performance monitoring system of the type described, a means for assuring that performance is monitored at times when it is appropriate for such monitoring to occur. More particularly, with a forced air system, it is appropriate to monitor system performance only when there is a circulating flow of air. Accordingly, in realizing this object of the present invention, provision is made for sensing the movement of the heated or cooled circulating fluid (in the usual case, air).

Yet a further object of the invention is to operate a system of the type described in accordance with a method in which the attainment of predetermined differentials across the intake and discharge of an air temperature modifying unit, as a function of time, is used to control operation of the system. In realizing this object of the invention, the attainment or non-attainment of certain target differentials within certain predetermined time intervals is used to control the operation of the system by either stopping such operation to prevent damage to and generate an error signal to call attention to a clearly defective system or cycling the system to operate a satisfactory system in the most economical way.

BRIEF DESCRIPTION OF DRAWINGS

Some of the objects of the invention having been stated, other objects will appear as the description proceeds, when taken in connection with the accompanying drawings, in which:

FIG. 2 is a diagram of one circuit capable of operating in accordance with the diagram of FIG. 1;

FIGS. 2A thru 2G are circuit diagrams of component circuits within FIG. 2;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
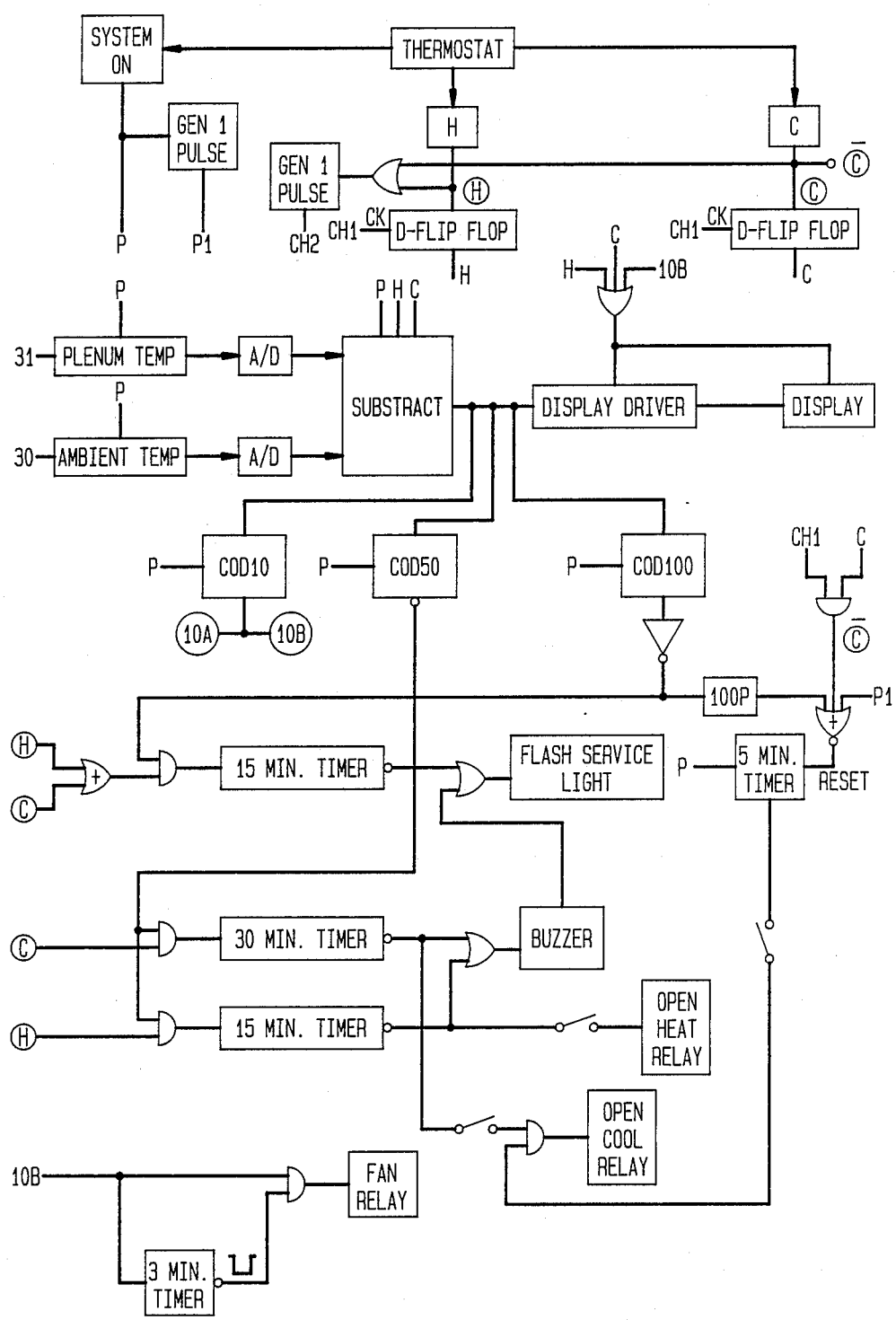
FIG. 1 is a schematic block diagram of one embodiment of the present invention.
Figure 2B:
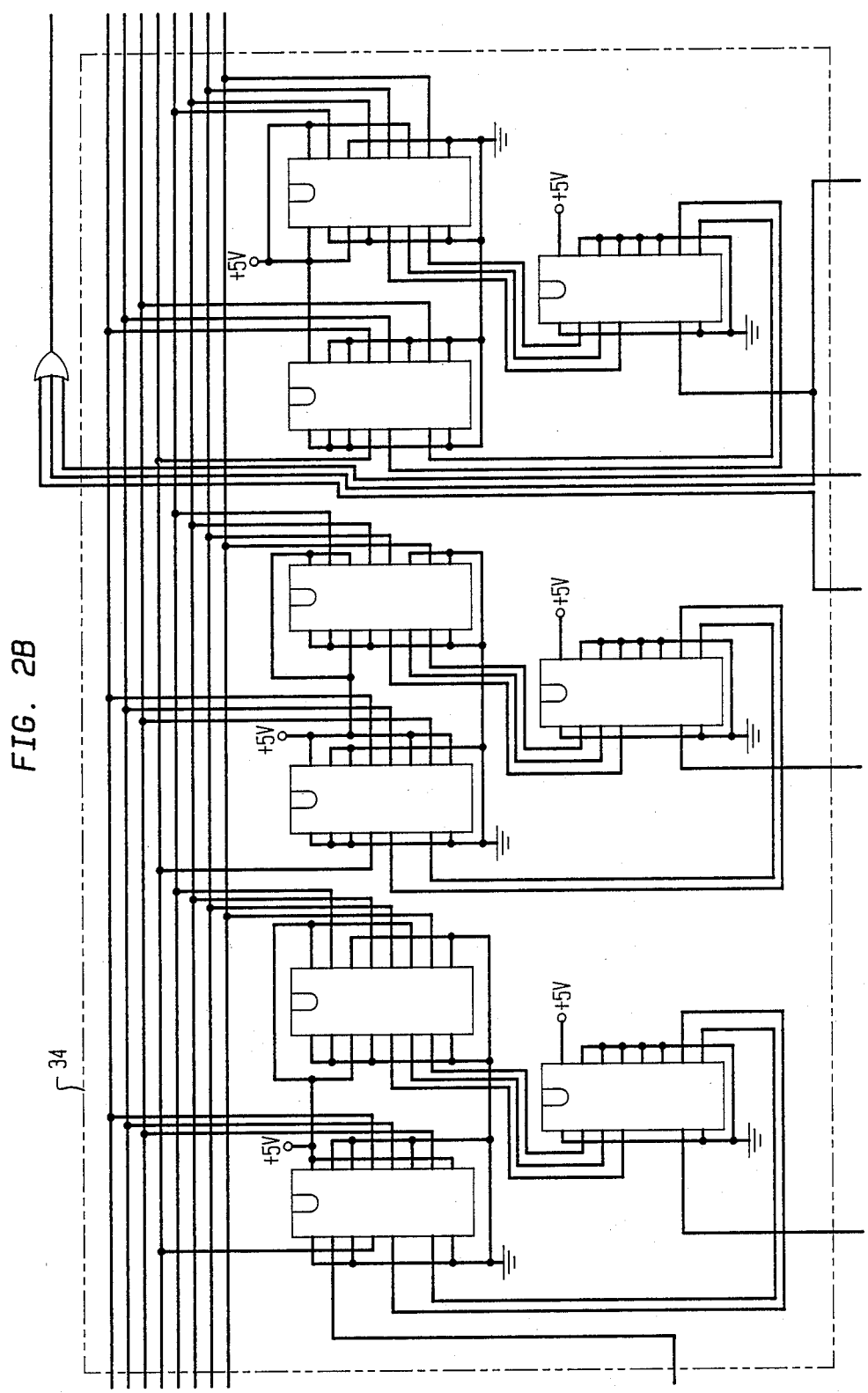
Figure 2D:
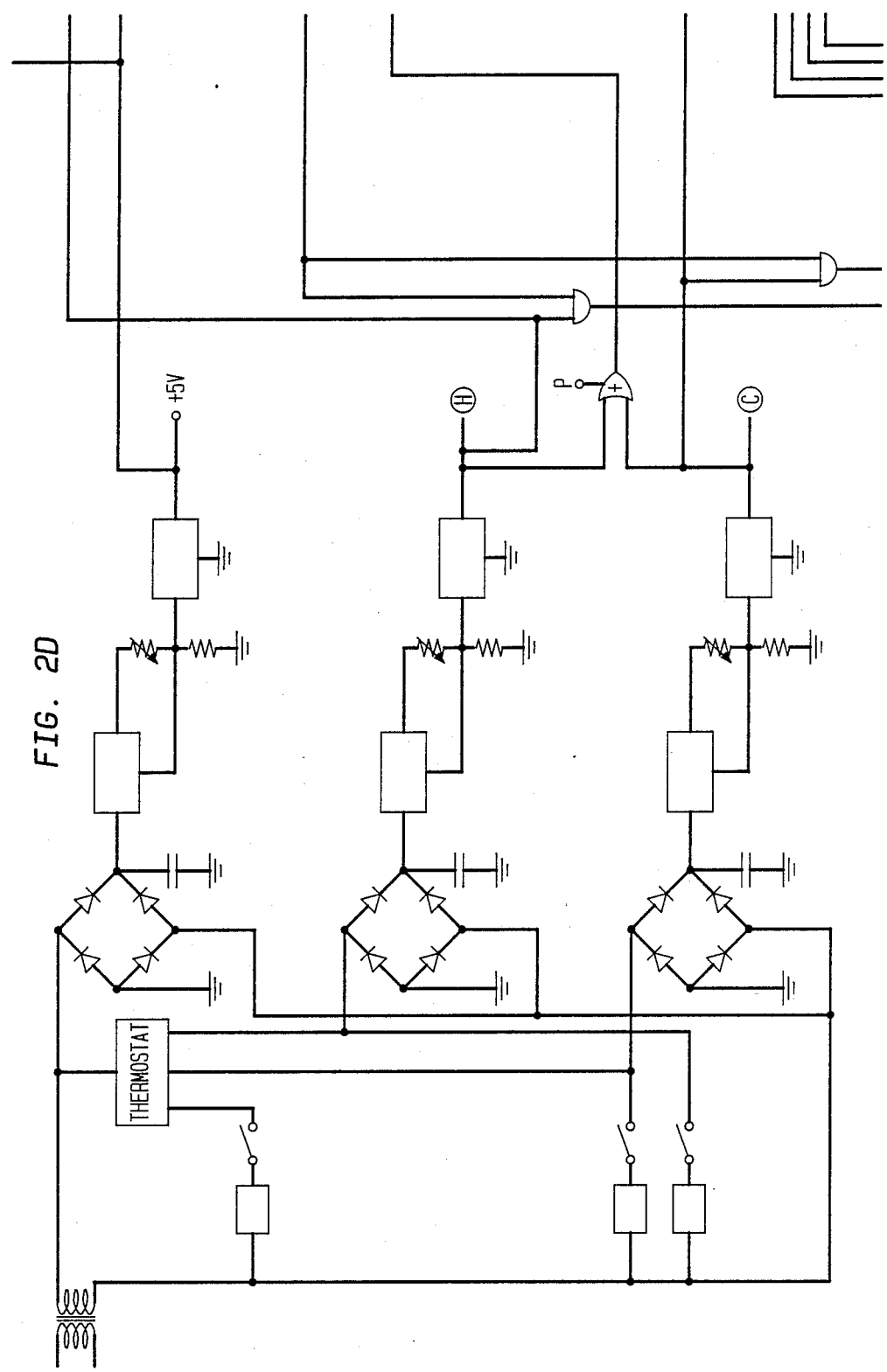
Figure 2E:
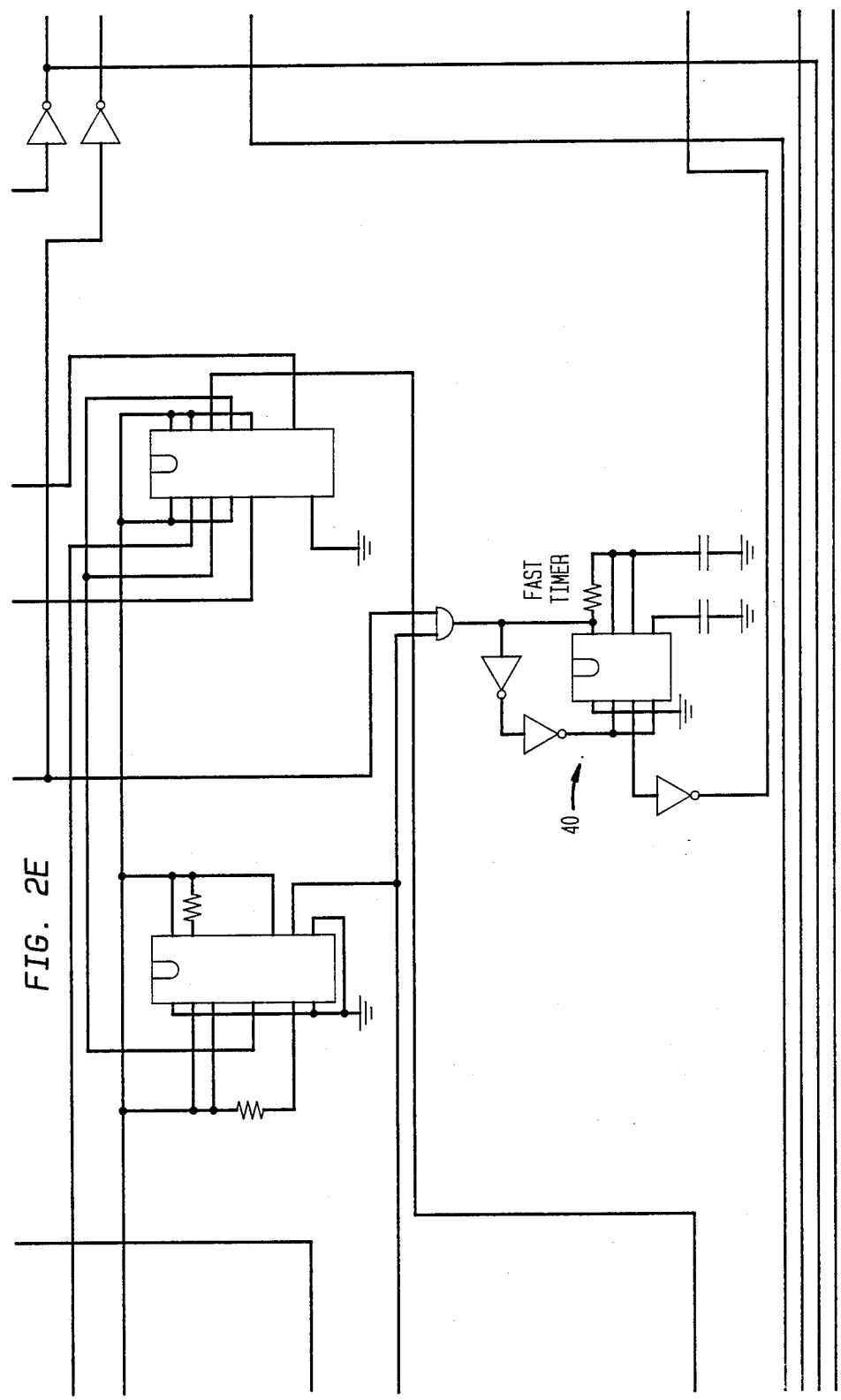
Figure 2F:
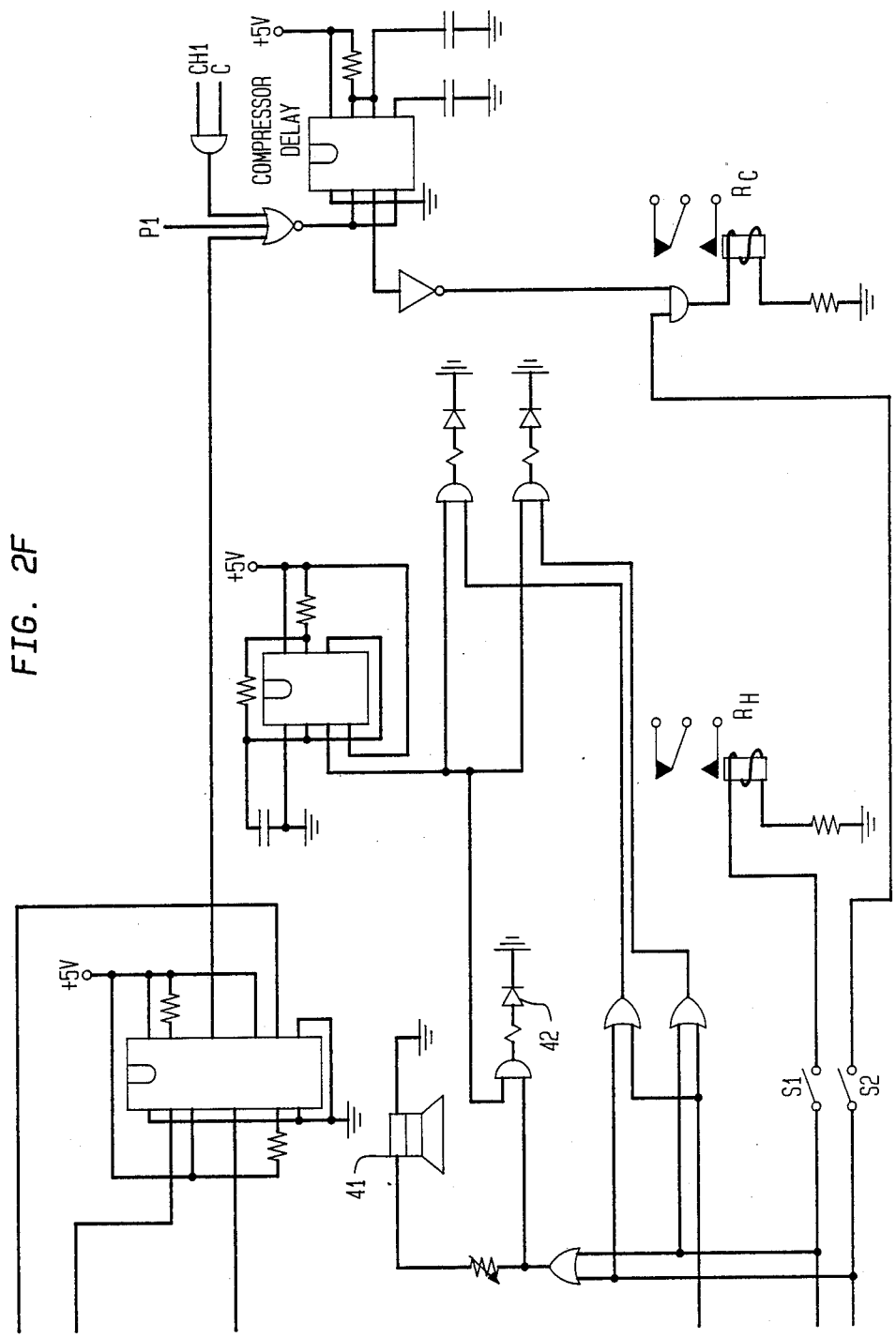

Referring now more particularly to the drawings, an apparatus as contemplated by this invention is there represented in two different ways—by the largely schematic diagram of FIG. 1 and a more explicit diagram of FIG. 2. It is to be understood at the outset that the diagram of FIG. 2 is one expression of a circuit which is capable of performing as indicated by FIG. 1, and that other forms may function in accordance with the description which follows. It is also to be understood that the diagrams are somewhat incomplete, in that certain components which are well known in the art are not shown. Thus, persons of skill in the appropriate arts will be able to understand that a complete apparatus incorporating this invention will include an air handling unit (not shown) having a fan for drawing a flow of air from a conditioned space into and through the unit and means for changing the temperature of the air as it passes through the unit. The means for changing the temperature of the air may be any suitable controllable source of heating or cooling, such as an evaporator or condenser coil for a mechanical refrigeration system, or a gas or oil fired heat exchanger. Interested readers needing further description of such systems are referred to the widely available commercial literature or prior patents for further descriptions of such apparatus.

As indicated, the apparatus in accordance with this invention includes a first temperature sensing means in the conditioned space for sensing the temperature of air in that space, generally known as a thermostat and indicated in FIGS. 1 and 2 at 20. It is typically the case in installations of the types with which this invention is used that provision is made for using a single thermostat for both heating and cooling, and such thermostats conventionally have switches for selecting a heating function, a cooling function, and providing manual control over the running of the fan. At least some systems may use dual thermostats or two stage thermostats, and such systems may be adapted to the present invention to be described hereinafter by using multiple systems in accordance with the invention. Control over the fan, heating source and cooling source is conventionally established by electrical relays or by valves, with such relays being indicated generally in the diagrams as fan relay 21; heating relay 22; and cooling relay 23. The thermostat also includes a temperature responsive switch which is settable for a desired temperature within the conditioned space and will open or close to indicate a need for modification of the temperature of air supplied to the space by the air handling unit.

Those elements described to this point, and their operation together, are essentially conventional.

In accordance with certain features of this invention as they relate to the preferred embodiment shown in the drawings, apparatus in accordance with this invention has, in addition to the first temperature sensor provided by the thermostat 20, second and third temperature sensors 30, 31 for sensing the temperatures of return air drawn to the unit and supply air expelled from the unit. These additional sensors provide signals, preferably analog electrical signals such as voltages which vary with temperature, which are supplied to and used by a processor means which, in the form shown in FIG. 2, takes the form of a group of TTL devices or chips connected together to perform certain functions described in greater detail hereinafter. As will be addressed hereinafter, the present invention contemplates that a microprocessor CPU chip operating under suitable programs or any other comparable type of device may be used instead of the TTL devices shown and described.

The apparatus in accordance with this invention also has, where applied to a forced air system, a means for detecting the flow of conditioned air. It is known that such an air flow detection means may take a wide variety of forms, including such element means as an anemometer or other flow responsive device mounted in the system ductwork adjacent a coil face or the like. However, in the preferred forms of this invention, it is contemplated that the air flow sensing means take the form of a self heated or indirectly heated NTC thermistor, a device in which the resistance varies with temperature. By determination of the resistance value of the device in the presence of a known air stream flowing over the device, a calibration may be accomplished by which air flow within a predetermined proper range can be identified. As a consequence, should air flow drop below that range (as from a filter becoming stopped or a coil iced up), a signal may be derived, an appropriate warning annunciator may be activated, and the processor signalled that the temperature differentials and times being determined are not representative of proper operation of the system. As will be appreciated by the thoughtful reader, determination of temperature differentials as will be described hereinafter will be most effective in providing an indication of system performance where the system is in fact performing, i.e. where air is flowing.

The processor means compares the temperatures sensed by said second and third temperature sensors, determines the temperature differential therebetween and the percentage of a predetermined optimum differential between the sensed return air and supply air temperatures which has been attained, and generates a percentage signal representative of such percentage. In association with timers to be described hereinafter and other circuitry, the processor determines (a) whether a predetermined percentage of a predetermined optimum differential between the sensed air and supply air temperatures has been attained within the first predetermined time interval and (b) whether the optimum differential has been attained within a second predetermined time interval and (c) whether the optimum differential has been attained before a desired temperature has been attained in the conditioned space, and functions for (d) interrupting operation of the associated temperature modifying unit and generating an alarm signal in the event of a determination that the predetermined percentage of the optimum differential has not been attained within the first predetermined time interval and (e) generating an error signal in the event of a determination that the optimum differential has not been attained within the second predetermined time interval and, if desired, (f) cycling the unit on and off in the event of a determination that the desired temperature has not been attained in the conditioned space upon the optimum differential being attained. These functions contribute to the enhanced performance and improved monitoring of operation which are objects of this invention.

As used in this description, the phrase "optimum differential" refers to a determination made after the basic operating conditions for a system have been established and using system performance data available from component manufacturers. One such procedure is discernible from pages 301 and 302 of "Refrigeration and Air Conditioning" by W. F. Stoecker (McGraw-Hill, 1958) which describe and give an example of a popular method of presenting coil performance data, a tabular form. Attention is invited to the table set forth as Table 21-1, where entering air conditions, face velocities of air flow, refrigerant temperatures, and final dry and wet bulb temperatures are set forth. From such a table, the determination of "optimum differential" becomes a simple matter, as most of the system variables will have been established before the control of the present invention is applied. For example, where applicant's apparatus is to be used with a 2 row coil, 35 degree refrigerant temperature and 400 fpm face velocity, the optimum differential of dry bulb temperatures is between 86 degree entering air and 69.3 degree exit air.

In FIG. 1, certain of the processor functions described thus far are performed by elements indicated as a differential determiner 32 and differential/optimal determiners 34. Circuit components performing these functions are similarly indicated in FIG. 2. It will be noted that a plurality of differential/optimal determiners 34 are provided. In the illustrate form of the invention, each of these elements determines that a predetermined percentage of the optimal conditioner has been attained. That is, one element or set of elements determines that 10% of the optimal differential has been attained; another 50%; a third a percentage which is adjustable between 0% and 100%; and a fourth, 100%. These percentages, which compared with certain timers, provide "flags" or indicators of system performance which control other indications given to an operator. It will be appreciated that one step in the determination is the conversion of the analog voltage signals derived from the sensors into digital signals for further processing, as the subsequent determinations are more readily made by such processing as described herein.

This invention contemplates that the optimal difference between return air and supply air temperatures may be different when heating is called for in the conditioned space and when cooling is called for in the conditioned space. For this reason, it is significant for the apparatus of this invention to distinguish between the two states of heating control and cooling control. With a conventional thermostat 20 the switch selection of such control or of fan operation provides input signals to the processor means which are used to permit determination with appropriate optimal differentials. Such signals are in addition to the signal indicating whether the first temperature sensor embodied in the thermostat is "satisfied" or calling for temperature change in the conditioned space. As will be understood, the presence of a heating or cooling demand signal will be the only indication of a need for a change in the temperature of the conditioned space.

As mentioned hereinabove, timer means are operatively connected for timing intervals of operation of the unit. Preferably, and for convenience in achieving the desired operation, and timer means takes the form of a plurality of timers. One timer 40 cooperates with one differential optimal determiner 34 for determining whether the system has attained a first predetermined percentage (in this instance, fifty percent) or the optimal differential within a first predetermined time interval (in this instance, ten or fifteen minutes). If such percentage is not attained, then the temperature modifying element is disabled, by opening of the related control relay. At the same time, an audible signal is emitted by an annunciator device such as a piezoelectric buzzer 41 and a visual warning is given by another annunciator device such as a light emitting diode 42.

Other timers 44, 45 cooperate with an differential/optimal determiner 34 for determining whether a second predetermined percentage (in this instance, on hundred percent) of the optimal differential has been attained within a second predetermined time interval (in this instance, fifteen minutes for heating cycles and thirty minutes for cooling cycles). In the event that the target differential is not attained within the applicable time interval, an error signal is generated and delivered to an appropriate annunciator device (in this instance, a light emitting diode) to indicate that the heating or cooling equipment needs to be checked for maintenance.

Other timers provide for continuing fan operation in the event that the system attains one hundred percent of the optimal differential within a predetermined time interval and while the temperature modifying element is disabled, and for preventing "short cycling" of a refrigeration producing mechanical compressor in such event. More particularly, should the differential/optimal determiner distinguishing one hundred percent attainment of an optimal differential signal that achievement within a predetermined time interval (in this instance, fifteen minutes), then the efficient operation of the system results in the heating or cooling system being stopped, even though the thermostat 20 may be calling for further temperature change in the conditioned space. In the event that the thermostat is unsatisfied, the fan of the air handling unit continues operation in order to extract from the temperature modifying element all of the then stored heat or cold. Thereafter should the thermostat still be calling for change in the conditioned area, the system is restarted. In such a restart, a further timer assures that the compressor of any mechanical refrigeration producer used as a cooling element is protected against excessively frequent starting, as such "short cycling" is known to be damaging to such compressors.

The apparatus of the present invention includes provision for visually indicating to an operator the relative efficiency of the system. Such a means takes the form, in the embodiments illustrated in FIG. 1, of a visual display 50. In the form illustrated in FIG. 2, the visual display is digital, and composed of three numerical indicators of known types capable of presenting a display of a numerical value indicative of the percentage of the optimal differential which is then being attained by the system. An alternate would be a bar graph analog display, described hereinafter.

In operation, the apparatus described functions within the context of well known methods in which the temperature of air within a conditioned space is controlled by circulating a flow of air while sensing the temperature of air in the conditioned space and changing the temperature of the flowing air in response to any difference between the sensed temperature thereof and a desired temperature. The improvements accomplished by the present invention lie in monitoring the efficiency of the method and controlling the temperature change and, as described above, include the steps of sensing the temperatures of return air drawn from the space and supply air returned to the space; responding to the sensed return and supply temperatures by comparing the return and supply temperatures and determining the temperature differential therebetween and the percentage of a predetermined optimum differential between the sensed return air and supply air temperatures which has been attained; determining whether a predetermined percentage of the predetermined optimum differential between the sensed return air and supply air temperatures has been attained within a predetermined time interval; and interrupting operation of said unit in the event of a determination that said predetermined percentage of said optimum differential has not been attained within said predetermined time interval. The method according to this invention also includes determining whether the optimum differential has been attained within a predetermined time interval; generating an error signal in the event of a determination that the optimum differential has not been attained within the predetermined time interval; and responding to the generation of an error signal by displaying a warning that the apparatus is operating below a desired efficiency.

Figure 3:
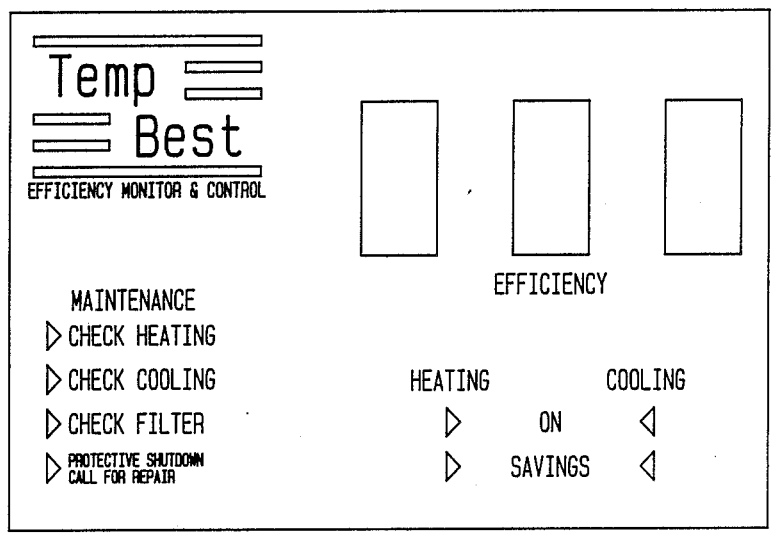
FIG. 3 is an illustration of a faceplate usable with a control operating as contemplated for the arrangements of FIGS. 1 and 2.
Figure 4:
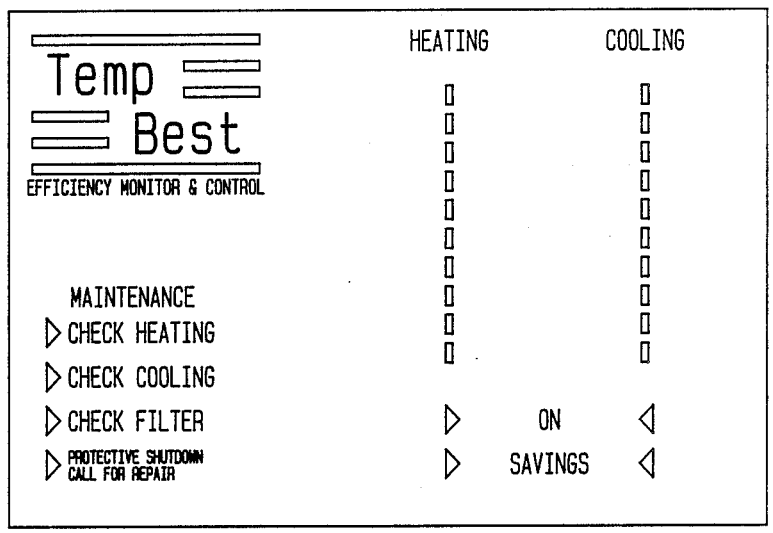
FIG. 4 is an illustration similar to FIG. 3 showing a modified form of faceplate for a modified form of the arrangements of FIGS. 1 and 2.

As alluded to hereinabove, certain of the indications to an operator are displayed at the face of a control in accordance with this invention. Two forms of such displays are shown in FIGS. 3 and 4. The principal difference between the two is the provision in FIG. 3 for a numerical display of percentage figures of efficiency. In FIG. 4, separate heating and cooling displays are provided in the form of bar graphs formed by a series of light emitting diodes. The bar graph diodes may be appropriately colored in the case of FIG. 4, using red color emitting diodes for the heating bar graph and green for the cooling. Alternatively, a single bar graph display may be provided by bi-color light emitting diodes which emit red light in heating and green in cooling. In each instance, a rising line of the bar graph indicates increasing efficiency, measured as an increasing achievement of the desired optimal differential between return and supply air temperatures. Additional indications are provided for displaying operation in heating and cooling modes; displaying operation in the high efficiency, saving mode where the desired optimal differential is attained within a short time interval and fan operation continues; displaying signals indicative of a need for maintenance checks of heating and cooling; and displaying the occurrence of a protective shutdown.

As will be understood by the knowledgeable reader, the results described may be accomplished with a number of forms or types of digital microprocessors capable of receiving and processing electrical signals of the types described above. Persons familiar with the selection and design of digital microprocessor circuits will be enabled by this discussion to select conventionally available circuitry to accomplish the functions of monitoring the signals from the temperature sensors described hereinabove and developing control signals to be supplied to the heating, cooling and fan relays in such a manner as to accomplish the control envisioned for the present invention.

By way of an illustrative example, microprocessors of the types known as 8013, 8015 and Z-80 may be programmed using machine language or higher level languages such as Basic to respond to digital signals received from the temperature sensors by processing such signals and developing control signals as described above. Specific programs will vary with the microprocessor chosen, the types of heating and cooling equipment used, and the desired characteristics of operation, all as discussed more fully hereinabove. For that reason, no detailed program listing is here given, it being considered that a knowledgeable programmer familiar with any of the aforementioned microprocessors will be able, from the present disclosure, to prepare such a listing and further that inclusion of an illustration of such a listing here would occupy an excessive number of pages of the present specification.

As alluded to briefly hereinabove, the present invention has application where the circulating fluid as to which the temperatures are sensed at the return and supply sides of a temperature modifying unit are other than air. More specifically, one contemplated application would be with conditioned space systems of the type known as hydronic systems, where the circulating fluid is a liquid such as water. With such a system, temperature sensing in accordance with this invention, and performance monitoring and control, could be accomplished either on the "air side" substantially as described hereinabove or, closer to the actual temperature modifier, on the "water side". It is believed that person of appropriate skill in the applicable arts will be able, from this brief discussion, to apply this invention to such systems and to others where the usefulness of the invention can be recognized.

In the drawings and specifications there has been set forth a preferred embodiment of the invention and, although specific terms are used, the description thus given uses terminology in a generic and descriptive sense only and not for purposes of limitation.

What is claimed is:

1. In an apparatus for changing the temperature of air in a conditioned space and having a first temperature sensor for sensing the temperature of air in the conditioned space and a temperature modifying unit for circulating a flow of air through the conditioned space and changing the temperature of the flowing air, the unit being operatively connected with and responsive to the first temperature sensor, an improved system for monitoring the efficiency of operation of the apparatus and comprising: second and third temperature sensors for sensing the temperature of circulating fluids; said second temperature sensor sensing the temperature of a supply fluid circulated to said temperature modifying unit; said third temperature sensor sensing the temperature of a return fluid circulated from said temperature modifying unit; processor means operatively connected with and responsive to said temperature sensors for comparing the temperatures sensed by said second and third temperature sensors and determining the temperature differential therebetween and the percentage of a predetermined optimum differential between the sensed return air and supply air temperatures which has been attained and generating a percentage signal representative of such percentage; and annunciator means operatively connected with said processor means and responsive to the generation of a percentage signal for displaying a visual indication of such percentage.

2. Apparatus according to claim 1 wherein said annunciator means comprises analog display means for indicating the percentage of attainment of said optimum differential.

3. Apparatus according to claim 2 wherein said analog display means indicates the percentage of attainment in the manner of a bar graph.

4. Apparatus according to claim 1 wherein said annunciator means comprises digital display means for indicating the percentage of attainment of said optimum differential by a numerical display.

5. Apparatus according to one of claims 1, 2 or 3 wherein said second temperature sensor senses the temperature of return air drawn to the unit and said third temperature sensor senses the temperature of supply air expelled from the unit.

6. Apparatus according to claim 5 further comprising means for sensing the flow of air through the unit and for generating a signal indicative of such flow being within a predetermined satisfactory range, and further wherein said processor means is operatively connected with and responsive to said air flow sensing means for varying the generation of a percentage signal in the event that such flow drops below said predetermined satisfactory range.

7. In an apparatus for changing the temperature of air in a conditioned space and having a first temperature sensor for sensing the temperature of air in the conditioned space and a temperature modifying unit for circulating a flow of air through the conditioned space and changing the temperature of the flowing air, the unit being operatively connected with and responsive to the first temperature sensor, an improved control system for optimizing the efficiency of operation of the apparatus and comprising: second and third temperature sensors for sensing the temperatures of return air drawn to the unit and supply air expelled from the unit; a timer operatively connected for timing intervals of operation of the unit; processor means operatively connected with and responsive to said temperature sensors and said timer for determining whether a predetermined percentage of a predetermined optimum differential between the sensed return air and supply air temperatures has been attained within a predetermined time interval and functioning for interrupting operation of said unit in the event of a determination that said predetermined percentage of said optimum differential has not been attained within said predetermined time interval.

8. Apparatus according to claim 7 wherein said processor means further determines whether said optimum differential has been attained within a second predetermined time interval and functions for generating an error signal in the event of a determination that said optimum differential has not been attained within said second predetermined time interval and further wherein said annunciator means is operatively connected with said processor means and responsive to the generation of an error signal for displaying a warning that the apparatus is operating below a desired efficiency.

9. In an apparatus for changing the temperature of air in a conditioned space and having a first temperature sensor for sensing the temperature of air in the conditioned space and a temperature modifying unit for circulating a flow of air through the conditioned space and changing the temperature of the flowing air, the unit being operatively connected with and responsive to the first temperature sensor, an improved control system for optimizing the efficiency of operation of the apparatus and comprising: second and third temperature sensors for sensing the temperatures of return air drawn to the unit and supply air expelled from the unit; a timer operatively connected for timing intervals of operation of the unit; processor means operatively connected with and responsive to said temperature sensors and said timer for determining whether a predetermined optimum differential between the sensed return air and supply air temperatures has been attained within a predetermined time interval and functioning for generating an error signal in the event of a determination that said optimum differential has not been attained within said second predetermined time interval; and annunciator means operatively connected with said processor means and responsive to the generation of an error signal for displaying a warning that the apparatus is operating below a desired efficiency.

10. Apparatus according to one of claims 7 or 9 wherein said processor means determines whether said optimum differential has been attained before a desired temperature has been attained in the conditioned space and functions for cycling said unit on and off in the event of a determination that said desired temperature has not been attained in the conditioned space upon said optimum differential being attained.

11. In an apparatus for changing the temperature of air in a conditioned space and having a first temperature sensor for sensing the temperature of air in the conditioned space and a temperature modifying unit for circulating a flow of air through the conditioned space and changing the temperature of the flowing air, the unit being operatively connected with and responsive to the first temperature sensor, an improved control system for optimizing the efficiency of operation of the apparatus and comprising: second and third temperature sensors for sensing the temperatures of return air drawn to the unit and supply air expelled from the unit; a timer operatively connected for timing intervals of operation of the unit; processor means operatively connected with and responsive to said temperature sensors and said timer for determining whether a predetermined optimum differential between the sensed return air and supply air temperatures has been attained before a desired temperature has been attained in the conditioned space and functioning for cycling said unit on and off in the event of a determination that said desired temperature has not been attained in the conditioned space upon said optimum differential being attained.

12. In an apparatus for changing the temperature of air in a conditioned space and having a first temperature sensor for sensing the temperature of air in the conditioned space and a temperature modifying unit for circulating a flow of air through the conditioned space and changing the temperature of the flowing air, the unit being operatively connected with and responsive to the first temperature sensor, an improved control system for optimizing the efficiency of operation of the apparatus and comprising: second and third temperature sensors for sensing the temperatures of return air drawn to the unit and supply air expelled from the unit; a timer operatively connected for timing intervals of operation of the unit; processor means operatively connected with and responsive to said temperature sensors and said timer for determining (a) whether a predetermined percentage of a predetermined optimum differential between the sensed return air and supply air temperatures has been attained within a first predetermined time interval and (b) whether said optimum differential has been attained within a second predetermined time interval and (c) whether said optimum differential has been attained before a desired temperature has been attained in the conditioned space, said processor means functioning for (d) interrupting operation of said unit in the event of a determination that said predetermined percentage of said optimum differential has not been attained within said first predetermined time interval and (e) generating an error signal in the event of a determination that said optimum differential has not been attained within said second predetermined time interval and (f) cycling said unit on and off in the event of a determination that said desired temperature has not been attained in the conditioned space upon said optimum differential being attained; and annunciator means operatively connected with said processor means and responsive to the generation of an error signal for displaying a warning that the apparatus is operating below a desired efficiency.

13. In an apparatus for changing the temperature of air in a conditioned space and having first temperature sensing means in the conditioned space for sensing the temperature of air in that space and an air handling unit with a fan for circulating a flow of air through the conditioned space and a temperature modifying element for changing the temperature of air flowing through the air handling unit and operatively connected with and responsive to the first temperature sensing means, an improved control system for optimizing the efficiency of operation of the apparatus and comprising: second and third temperature sensing means for sensing the temperatures of return air drawn to the air handling unit and supply air expelled from the unit; timer means for timing intervals of operation of the temperature modifying element; processor means operatively connected with and responsive to said temperature sensing means and said timer means for determining the differential between the return and supply air temperatures and for comparing the determined differential over time with a predetermined optimum differential, said processor means being operatively connected with the temperature modifying element for interrupting operation thereof and generating a warning signal in the event that the determined differential is below a predetermined percentage of the optimum differential after a predetermined time interval; annunciator means operatively connected with said processor means and responsive thereto for warning an operator in the event that the determined differential is below the optimum differential after a second, longer predetermined time interval; and cycle means operatively connected with said processor means and responsive thereto for cycling the temperature modifying element off and on in the event that the determined differential equals the optimum differential at a time that the first temperature sensing means senses that the temperature in the conditioned space is other than a predetermined desired temperature.

14. In a method of controlling the temperature of air circulating in a conditioned space and which includes steps of sensing the temperature of air in the conditioned space, circulating a flow of air through the conditioned space and changing the temperature of the flowing air in response to any difference between the sensed temperature thereof and a desired temperature, an improvement in monitoring the efficiency of the method which comprises the steps of sensing the temperatures of return air drawn from the space and supply air returned to the space; responding to the sensed return and supply temperatures by comparing the return and supply temperatures and determining the temperature differential therebetween and the percentage of a predetermined optimum differential between the sensed return air and supply air temperatures which has been attained; generating a percentage signal representative of such percentage; and responding to the generation of a percentage signal by displaying a visual indication of such percentage.

15. A method according to claim 14 wherein the step of displaying a visual indication of a percentage comprises displaying a numerical indication of such percentage.

16. A method according to claim 14 wherein the step of displaying a visual indication of a percentage comprises displaying an analog representation of such percentage.

17. In a method of controlling the temperature of air circulating in a conditioned space and which includes steps of sensing the temperature of air in the conditioned space, circulating a flow of air through the conditioned space and changing the temperature of the flowing air in response to any difference between the sensed temperature thereof and a desired temperature, an improvement in monitoring the efficiency of the method and controlling the temperature change which comprises the steps of sensing the temperatures of return air drawn from the space and supply air returned to the space; responding to the sensed return and supply temperatures by comparing the return and supply temperatures and determining the temperature differential therebetween and the percentage of a predetermined optimum differential between the sensed return air and supply air temperatures which has been attained; determining whether a predetermined percentage of the predetermined optimum differential between the sensed return air and supply air temperatures has been attained within a predetermined time interval; interrupting operation of said unit in the event of a determination that said predetermined percentage of said optimum differential has not been attained within said predetermined time interval; and generating an alarm signal for alerting an operator to an equipment shutdown.

18. A method according to claim 17 further comprising the steps of determining whether said optimum differential has been attained within a second predetermined time interval; generating an error signal in the event of a determination that said optimum differential has not been attained within said second predetermined time interval; and responding to the generation of an error signal by displaying a warning that the apparatus is operating below a desired efficiency.

* * * * *